Patented Dec. 19, 1950

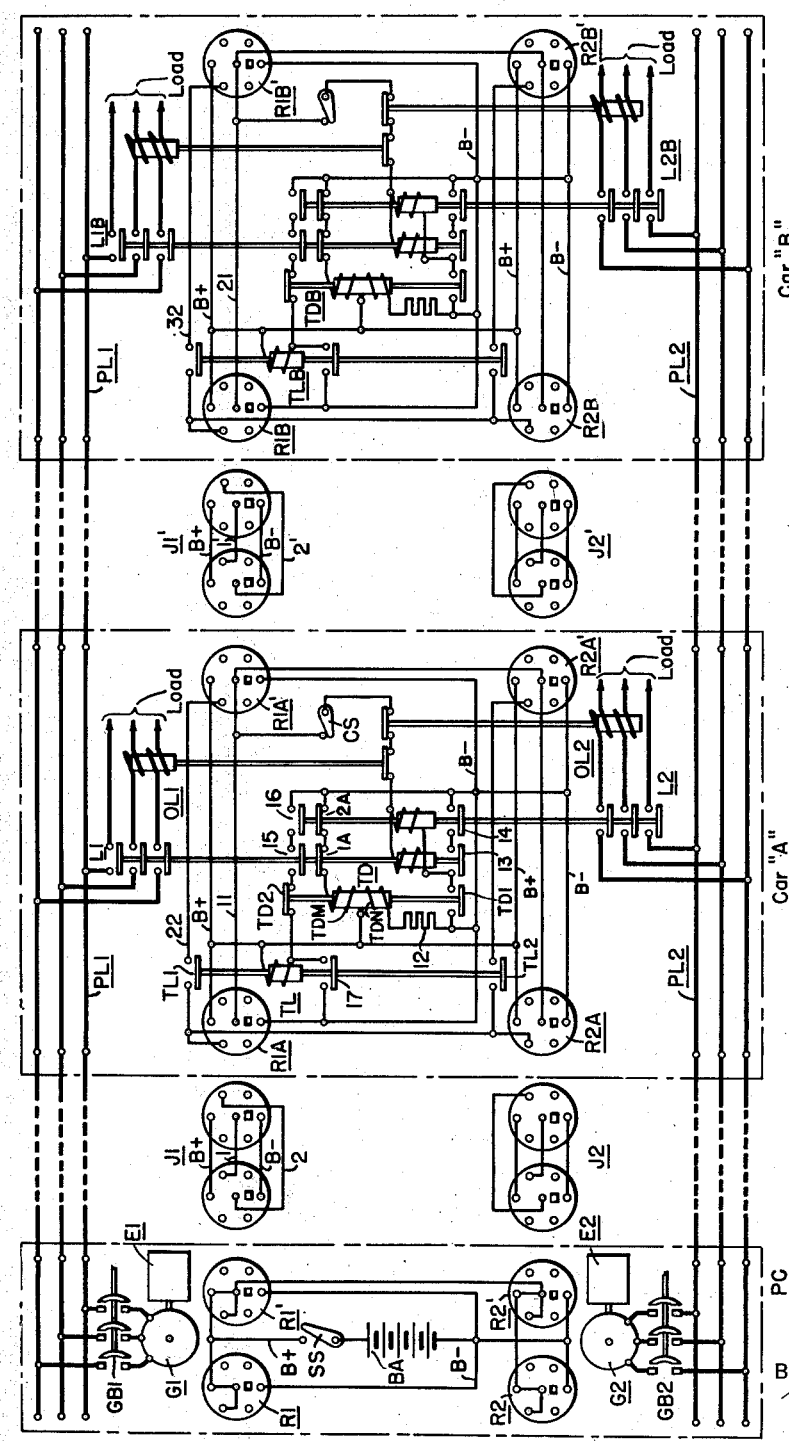

2,534,898

UNITED STATES PATENT OFFICE 2,534,898

HEAD-END POWER SYSTEM FOR RAILWAY CARS

Robert E. Burkhart and George R. Purifoy, Pittsburgh, Pa., assignors to Westinghouse Electric Corporation, East Pittsburgh, Pa., a corporation of Pennsylvania Application January 21, 1949, Serial No. 71,798

7 Claims. (Cl. 171—97)

1

Our invention relates, generally, to power systems and, more particularly, to a power system which may be referred to as a head-end power system for supplying electric power to all of the auxiliary electrical equipment on the various cars of an entire railway train from power generating apparatus in a separate power car at the head-end of the train through an electric power line running the entire length of the train.

In such a system it is desirable to prevent the electrical equipment such as air conditioners, etc. on all of the cars of the train from being started simultaneously, so as not to overload the generator in the power car. It is also desirable to prevent overloading the equipment on one car without interfering with the operation of the equipment on the remaining cars of a train.

An object of our invention, generally stated, is to provide a head-end power system which shall be simple and efficient in operation and which may be economically manufactured and installed.

A more specific object of our invention is to provide for the sequential starting of the electrical equipment in the cars of a train having a head-end power system.

Another object of our invention is to provide, in a power system of the character described, protection for the equipment in each car against overload without interfering with the operation of the equipment in the other cars of a train.

Other objects of our invention will be explained fully hereinafter or will be apparent to those skilled in the art.

In accordance with one embodiment of our invention, a time delay relay and a train line relay are provided on each of the electrically equipped cars of a train and these relays are so connected in the control system that the equipment is started sequentially. Overload relays are so connected that the equipment in a car is automatically disconnected in the event of an overload without interfering with the operation of the equipment in the other cars of a train.

For a better understanding of the nature and objects of our invention, reference may be had to the following detailed description, taken in conjunction with the accompanying drawing, in which the single figure is a diagrammatic view of a control system embodying the principal features of our invention.

Referring to the drawing, the power system shown therein comprises a power car PC and two apparatus cars A and B. It will be understood that additional apparatus cars may be provided if desired. The control apparatus for each additional car would be a duplicate of the apparatus in one of the cars illustrated.

The power generating apparatus in the power car PC comprises an alternating current generator G1 which is driven by an engine E1 and a similar generator G2 driven by an engine E2. The generator G1 may be connected to a power train line PL1 by means of a circuit breaker GB1. Likewise, the generator G2 may be connected to a power train line PL2 by means of a circuit breaker GB2. The power train lines PL1 and PL2 extend the entire length of the train, the connections between cars being made by suitable jumpers.

As shown, plug receptacles R1 and R2 and jumpers J1 and J2 are provided for making the control connections between cars for operating the various relays and contactors required for the operation of the program starting system. The receptacles and jumpers are so constructed that they can be connected in only one position, thereby insuring that the proper circuits are established when the jumpers are connected. As shown, receptacles are provided at each end of the power car and at each end of each one of the apparatus cars. It does not matter which end of a given car is adjacent to the next car or what position in the train any car occupies.

The control apparatus in each apparatus car comprises line switches L1 and L2 for connecting the power train lines PL1 and PL2, respectively, to load circuits in the car. Overload relays OL1 and OL2 are provided in the load circuits for protecting the equipment connected to the load circuits against overloads, as will be described more fully hereinafter.

A time delay relay TD and a train line relay TL are provided in each car for securing the desired sequence of operation of the line switches to prevent the equipment in all of the cars from being started simultaneously which would result in overloading the power generating apparatus. A control switch CS is provided in each car for disconnecting the control apparatus in case it is not desired to operate the equipment in a car. The source of power for the operation of the control for the program starting system is a battery BA located in the power car PC.

In order that the functioning of the foregoing apparatus may be more clearly understood the operation of the system will now be described in more detail. Assuming that the power generating apparatus is in operation and that the generator breakers GB1 and GB2 have been closed to connect the generators to their respective power lines, a starting switch SS is closed, thereby energizing train line conductors B+ and B— throughout the train. It should be noted that the control system will function properly with only one jumper J1 or J2 connected between each pair of cars. However, two jumpers are provided as a safety feature.

When the starting switch SS is closed the main coils TDM and the neutralizing coils TDN of the time delay relays TD are energized on all of the cars. The main coil TDM on the relay in car A is connected across the conductors B+ and B— through interlocks 1A and 2A on the line switches L1 and L2, respectively. The neutralizing coil TDN is connected across the conductors B+ and B— through a resistor 12. The time delay relays in the other cars are connected in the same manner as the relay in car A.

The closing of the starting switch SS also energizes the wire marked 1 in the jumper J1 and the train line conductor 11 in the car A which is connected to the jumper J1. The energization of the wire 11 energizes the actuating coils of the line switches L1 and L2 through a circuit which extends from the conductor 11 through the control switch CS, contact members of the overload relays OL2 and OL1, the actuating coils of the line switches L2 and L1 and contact members TD1 of the time delay relay TD to the conductor B—. The closing of the line switches connects the load circuits in car A to the power train lines PL1 and PL2, thereby applying the main generator power to the car equipment. A holding circuit for the line switches is provided through interlocks 13 and 14 on the switches L1 and L2, respectively.

When the line switches L1 and L2 on car A are closed, the interlocks 1A and 2A on these switches are opened, thereby deenergizing the main coil TDM of the time delay relay TD. After a predetermined time delay, for example three to five seconds, the armature of the relay TD drops to its lowermost position, thereby closing its contact members TD2. The closing of the contact members TD2 establishes an energizing circuit for the actuating coil of the train line relay TL. This circuit extends from the conductor B+ through the actuating coil of the relay TL, the contact members TD2 and interlocks 15 and 16 on the line switches L1 and L2, respectively, to the conductor B—.

The closing of the train line relay TL connects a train line conductor 22 to a jumper wire 2 which, in turn, is connected to the conductor B+ on the power car. The energization of the train line conductor 22 on car A energizes the jumper wire 1' in the jumper J1' between cars A and B which, in turn, energizes conductor 21 on car B. The energization of the conductor 21 causes the closing of the line switches L1B and L2B in the same manner as the energization of the conductor 11 caused the closing of the switches L1 and L2 on car A. In this manner power is applied to the load circuits on car B.

When the line switches L1B and L2B are closed, the main winding of the time delay relay TDB on car B is deenergized, as described with reference to car A. After a time delay of from three to five seconds, the armature of the time delay relay TDB on car B drops to its lowermost position, thereby energizing the actuating coil of the train line relay TLB on car B. The closing of the contact members of the train line relay TLB energizes a train line conductor 32 on car B which, in turn, causes the closing of the line switches on the next car in the manner hereinbefore described.

This system of starting continues in the manner described until the equipment on all cars of the train is connected to the power train line. From 54 to 90 seconds will be required to get all of the cars of an 18 car train into operation, depending upon the timing characteristics of the time delay relays.

After the complete train is in operation, the equipment in each car is then under the control of the overload relays provided on that car. In case of an overload on an individual car, only that car on which the fault occurs will be disconnected from the power train line.

For example, if an overload occurs on car A, the contact members on either the overload relay OL1 or OL2 will open, thereby deenergizing the actuating coils of the line switches L1 and L2. However, the actuating coil of the train line relay TL remains energized through its own interlock 17, thereby retaining the relay closed. In this manner the train line conductor 22 is kept energized, thereby maintaining all of the other cars in the train in operation.

From the foregoing description, it is apparent that we have provided a power system which is automatically controlled after the starting switch in the power car is closed and provided the jumpers between cars are in place. The system requires a small amount of control apparatus and utilizes a source of low voltage for operating the control apparatus. The power consuming equipment in all of the cars of a train cannot be started simultaneously which would endanger the operation of the main generating apparatus. However, the time required to start the equipment on all cars of a passenger train of the usual number of cars is so short that the passengers on the cars are not unduly inconvenienced.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system, in combination, a power train line, a load circuit, a line switch for connecting the power train line to the load circuit, a time delay relay, interlocks on said line switch for controlling the energization of said time delay relay, a train line relay, said time delay relay controlling the energization of said train line relay, and a train line conductor, said train line relay controlling the energization of said train line conductor.

2. In a control system, in combination, a power train line, a load circuit, a line switch for connecting the power train line to the load circuit, a time delay relay, interlocks on said line switch for controlling the energization of said time delay relay, a train line relay, said time delay relay controlling the energization of said train line relay, a train line conductor, said train line relay controlling the energization of said train line conductor, and an overload relay responsive to the current in said load circuit, said overload relay controlling the energization of said line switch.

3. In a control system, in combination, a power train line, a load circuit, a line switch for connecting the power train line to the load circuit, a time delay relay, interlocks on said line switch for controlling the energization of said time delay relay, a train line relay, said time delay relay controlling the energization of said train line relay, a train line conductor, said train line relay controlling the energization of said train line conductor, and an overload relay responsive to the current in said load circuit, said overload relay controlling the energization of said line switch without affecting the energization of said train line conductor.

4. In a control system, in combination, a power train line, a load circuit, a line switch for connecting the power train line to the load circuit, a time delay relay, interlocks on said line switch for controlling the energization of said time delay relay, a train line relay, said time delay relay cooperating with said line switch in controlling the energization of said train line relay, and a train line conductor, said train line relay controlling the energization of said train line conductor.

5. In a control system, in combination, a power train line, a load circuit, a line switch for connecting the power train line to the load circuit, a time delay relay, interlocks on said line switch for controlling the energization of said time delay relay, a train line relay, said time delay relay cooperating with said line switch in controlling the energization of said train line relay, a train line conductor, said train line relay controlling the energization of said train line conductor, and an overload relay responsive to the current in said load circuit, said overload relay controlling the energization of said line switch.

6. In a power system, in combination, power generating apparatus, a power train line, switching means for connecting said apparatus to said train line, a plurality of load circuits, a line switch for connecting each of said load circuits to said train line, a time delay relay and a train line relay associated with each line switch to cause said line switches to be operated in sequential relation, interlocks on each line switch for controlling the energization of its associated time delay relay, and each time delay relay controlling the energization of its associated train line relay.

7. In a power system, in combination, power generating apparatus, a power train line, switching means for connecting said apparatus to said train line, a plurality of load circuits, a line switch for connecting each of said load circuits to said train line, a time delay relay and a train line relay associated with each line switch to cause said line switches to be operated in sequential relation, interlocks on each line switch for controlling the energization of its associated time delay relay, each time delay relay controlling the energization of its associated train line relay, and a train line conductor energized through each train line relay.

ROBERT E. BURKHART.
GEORGE R. PURIFOY.

REFERENCES CITED

The following references are of record in the file of this patent:

UNITED STATES PATENTS

| Number | Name | Date |
|---|---|---|
| Re. 22,168 | Hamilton | Sept. 1, 1942 |
| 2,231,052 | Bryson | Feb. 11, 1941 |